(12) United States Patent
Starns

(10) Patent No.: US 8,526,802 B1
(45) Date of Patent: Sep. 3, 2013

(54) COLLAPSIBLE IMAGE CAPTURE SYSTEM

(75) Inventor: Alex Starns, Redwood City, CA (US)

(73) Assignee: Google Inc., Mountain View, CA (US)

( * ) Notice: Subject to any disclaimer, the term of this patent is extended or adjusted under 35 U.S.C. 154(b) by 59 days.

(21) Appl. No.: 13/196,531

(22) Filed: Aug. 2, 2011

Related U.S. Application Data

(60) Provisional application No. 61/445,858, filed on Feb. 23, 2011.

(51) Int. Cl.
*G03B 15/02* (2006.01)
*G03B 41/00* (2006.01)
*G03B 27/52* (2006.01)

(52) U.S. Cl.
USPC ............... 396/1; 396/333; 396/428; 348/159; 355/21; 248/464

(58) Field of Classification Search
USPC ......... 396/1, 4–5, 20, 325, 333, 419; 355/63, 355/75; 182/155; 248/463–464
See application file for complete search history.

(56) References Cited

U.S. PATENT DOCUMENTS

| | | | | |
|---|---|---|---|---|
| 3,228,283 | A * | 1/1966 | Fulton et al. | 396/428 |
| 3,396,649 | A * | 8/1968 | Bishop et al. | 396/428 |
| 3,586,278 | A * | 6/1971 | Simons | 248/165 |
| 3,952,322 | A * | 4/1976 | Wolfe | 396/4 |
| 5,077,640 | A * | 12/1991 | Butler, Jr. | 362/11 |
| 6,088,541 | A * | 7/2000 | Meyer | 396/155 |
| 6,161,807 | A * | 12/2000 | Steiner et al. | 248/166 |
| 7,643,748 | B2 * | 1/2010 | Cameron et al. | 396/325 |
| 7,789,356 | B1 * | 9/2010 | Jones | 248/178.1 |
| 8,042,653 | B2 * | 10/2011 | Grebinoski et al. | 182/223 |

\* cited by examiner

*Primary Examiner* — Clayton E LaBalle
*Assistant Examiner* — Leon W Rhodes, Jr
(74) *Attorney, Agent, or Firm* — Marshall, Gerstein & Borun LLP

(57) ABSTRACT

An image capture system that is capable of capturing images of both small and large target objects includes a collapsible frame and at least one image capture device. The frame is free-standing and adapted to support the image capture device over a generally flat surface, on which a target object can also be supported. The image capture device can be activated to capture an image of the target object for subsequent viewing, storage, retrieval, processing, etc. The collapsible frame is constructed of a plurality of structural components adjustably connected together in a unique configuration that enables the entire frame to be transformed between a stored configuration when not in use, and a deployed configuration during use. The stored configuration is substantially more compact than the deployed configuration, which allows the frame to be easily transported between different locations.

21 Claims, 8 Drawing Sheets

COLLAPSIBLE IMAGE CAPTURE SYSTEM

CROSS-REFERENCE TO RELATED APPLICATIONS

The priority benefit of U.S. Provisional Patent Application No. 61/445,858, filed Feb. 23, 2011, is hereby claimed and the entire contents thereof are incorporated herein by reference.

FIELD OF THE DISCLOSURE

The present disclosure is related to image capture devices such as scanners, for example, for capturing and storing electronic images of hard copy documents.

BACKGROUND

Image capture devices such as digital scanners, for example, have become popular for generating and storing electronic files of existing hard copy documents. Some benefits of storing documents electronically can include a reduction in physical storage space, easy reproduction and sharing of the electronic files, and the ability for multiple users to access the electronic files from various locations. Some conventional digital scanners include desktop flatbed type scanners, hand-held wand type scanners, and digital camera based scanners. Many smartphones can even be equipped with applications that enable a digital camera embedded in the smartphone to capture an image of a document and convert the image into a computer readable file such as a JPEG file or a PDF file, for example. Existing digital scanners, however, are limited in their capacity to capture images of documents larger than standard paper sizes, including for example, fold-out maps, pamphlets, books, posters, etc.

SUMMARY

One aspect of the present disclosure includes a collapsible image capture system having a primary boom member, a first leg, a second leg, and at least one image capture device. The primary boom member has a first end and a second end, and at least first and second boom components slidably disposed relative to each other for adjusting a longitudinal dimension of the primary boom member. The first leg is coupled to the first end of the primary boom member and pivotable between a storage position that is substantially parallel to the primary boom member and a deployed position that is substantially perpendicular to the primary boom member. The first leg includes first and second leg components slidably disposed relative to each other for adjusting a longitudinal dimension of the first leg. The second leg is coupled to the second end of the primary boom member and pivotable between a storage position that is substantially parallel to the primary boom member and a deployed position that is substantially perpendicular to the primary boom member. The second leg includes first and second leg components slidably disposed relative to each other for adjusting a longitudinal dimension of the second leg. The at least one image capture device is removably supported by the primary boom member at a location between the first and second legs when the first and second legs occupy the deployed positions. The image capture device has a field of view adapted to capture at least a portion of a target object disposed between the first and second legs.

In some aspects, the first and second boom components have parallel or coincident central longitudinal axes.

In some aspects, the first and second leg components of the first leg have parallel or coincident central longitudinal axes, and the first and second leg components of the second leg have parallel or coincident central longitudinal axes.

In some aspects, the system further includes a first leg pivot connector coupling the first leg to the first end of the primary boom member and a second leg pivot connector coupling the second leg to the second end of the primary boom member.

In some aspects, the system further includes a fixing device associated with each of the first and second leg pivot connectors for selectively fixing the first and second legs, respectively, in the storage position and the deployed position.

In some aspects, the system further includes a boom slide connector, a first leg slide connector, and a second leg slide connector. The boom slide connector slidably connects the first and second boom components relative to each other. The first leg slide connector slidably connects the first and second leg components of the first leg to each other. The second leg slide connector slidably connects the first and second leg components of the second leg to each other.

In some aspects, the system further includes a fixing device associated with each of the boom slide connector, the first leg slide connector, and the second leg slide connector for selectively fixing the position of the first and second boom components relative to each other, the first and second leg components of the first leg relative to each other, and the first and second leg components of the second leg relative to each other, respectively.

In some aspects, the system further includes at least one first foot and at least one second foot. The at least one first foot is coupled to the first leg opposite the primary boom member and is pivotable between a storage position substantially parallel to the first leg and a deployed position substantially perpendicular to the first leg. The at least one second foot is coupled to the second leg opposite the primary boom member and is pivotable between a storage position substantially parallel to the second leg and a deployed position substantially perpendicular to the second leg. The at least one first foot and at least one second foot are adapted to support the first and second legs and the primary boom member on a support surface.

In some aspects, the image capture device comprises a digital sensor including one of a charge-coupled device (CCD) sensor or a complementary metal-oxide semiconductor (CMOS) sensor.

In some aspects, the image capture devices includes a polarizer.

In some aspects, the image capture device comprises a single lens reflex (SLR) camera.

In some aspects, the system further includes at least one illumination device removably supported by the primary boom component for illuminating the target supported between the first and second legs.

In some aspects, the at least one illumination source comprises at least one of a diffuser, a polarizer, and a filter.

In some aspects, the system further includes first and second secondary booms mounted perpendicular to the primary boom and arranged parallel to each other, and wherein the at least one image capture device comprises first and second image capture devices removably mounted to opposing ends of the first secondary boom and third and fourth image capture devices removably mounted to opposing ends of the second secondary boom, the first, second, third, and fourth image capture devices collectively defining the field of view for capturing first, second, third, and fourth images of first, second, third, and fourth regions, respectively, of the target object.

In some aspects, the system further includes a wireless trigger in communication with each of the first, second, third, and fourth image capture devices for synchronizing the capture of the first, second, third, and fourth images.

Another aspect of the present disclosure includes a collapsible image capture system, having a primary boom member, a boom fixing device, a first leg, a first leg pivot connector and associated fixing device, a first fixing device, a second leg, a second leg pivot connector and associated fixing device, a second fixing device, at least one image capture device, and at least one illumination device. The primary boom member has a first end and a second end, and at least first and second boom components slidably disposed relative to each other for adjusting a longitudinal dimension of the primary boom member. The boom fixing device is carried by the first boom component and selectively operable to fix the first and second boom components relative to each other. The first leg is coupled to the first end of the primary boom member and pivotable between a storage position that is substantially parallel to the primary boom member and a deployed position that is substantially perpendicular to the primary boom member. The first leg includes first and second leg components slidably disposed relative to each other for adjusting a longitudinal dimension of the first leg. The first leg pivot connector and associated fixing device are carried by the primary boom member and selectively operable to fix the first leg in the storage position and the deployed position. The first fixing device is carried by the first leg component of the first leg and selectively operable to fix the first and second leg components of the first leg relative to each other. The second leg is coupled to the second end of the primary boom member and pivotable between a storage position that is substantially parallel to the primary boom member and a deployed position that is substantially perpendicular to the primary boom member. The second leg includes first and second leg components slidable relative to each other for adjusting a longitudinal dimension of the second leg. The second leg pivot connector and associated fixing device are carried by the primary boom member and selectively operable to fix the second leg in the storage position and the deployed position. The second fixing device is carried by the first leg component of the second leg and selectively operable to fix the first and second leg components of the second leg relative to each other. The at least one image capture device is removably supported by the primary boom member at a location between the first and second legs when the first and second legs occupy the supporting positions, and has a field of view adapted to capture at least a portion of a target object disposed between the first and second legs. The at least one illumination device is removably supported by to the primary boom component for illuminating the target supported between the first and second legs.

In some aspects, the system further includes a boom slide connector, a first leg slide connector, and a second leg slide connector. The boom slide connector is associated with the primary boom member for facilitating sliding adjustment of the first and second boom components relative to each other. The first leg slide connector is associated with the first leg for facilitating sliding adjustment of the first and second leg components of the first leg relative to each other. The second leg slide connector is associated with the second leg for facilitating sliding adjustment of the first and second leg components of the second leg relative to each other.

In some aspects, the first and second boom components have parallel or coincident central longitudinal axes.

In some aspects, the first and second leg components of the first leg have parallel or coincident central longitudinal axes, and the first and second leg components of the second leg have parallel or coincident central longitudinal axes.

Another aspect of the present disclosure includes a portable image capture kit, having a frame, at least one image capture device, at least one illumination device, and at least one carrying case. The frame is transformable between a stored configuration for facilitating transportation of the frame and a deployed configuration during use. The frame includes a primary boom member, a first leg, and a second leg, the first and second legs pivotably coupled to opposing ends of the primary boom member. The primary boom member includes at least first and second boom components slidably disposed relative to each other for adjusting a longitudinal dimension of the primary boom member. The first leg is pivotable between a storage position that is substantially parallel to the primary boom member and a deployed position that is substantially perpendicular to the primary boom member. The first leg includes first and second leg components slidably disposed relative to each other for adjusting a longitudinal dimension of the first leg. The second leg is pivotable between a storage position that is substantially parallel to the primary boom member and a deployed position that is substantially perpendicular to the primary boom member. The second leg includes first and second leg components slidably disposed relative to each other for adjusting a longitudinal dimension of the second leg. The at least one image capture device is adapted to be removably supported by the primary boom member at a location between the first and second legs when the frame occupies the deployed configuration, and has a field of view adapted to capture at least a portion of a target object disposed between the first and second legs when the image capture device is supported by the primary boom member. The at least one illumination device is adapted to be removably supported by the primary boom member for selectively illuminating the target object when the frame occupies the deployed configuration. The at least one carrying case is adapted to accommodate at least one of the collapsible frame, the at least one image capture device, and the at least one illumination device.

DETAILED DESCRIPTION

The present disclosure is generally directed to an image capture system, e.g., a scanner, that is capable of capturing images of both small and large target objects, e.g., books, letters, maps, posters, etc., while also being collapsible to facilitate easy transport. The system includes a collapsible frame and at least one image capture device, e.g., a digital camera, coupled to the frame. The frame is free-standing and adapted to support the image capture device over a generally flat surface such as a table, for example, on which a target object can also be supported. So configured, the image capture device can be activated to capture an image of the target object for subsequent viewing, storage, retrieval, processing, etc. The collapsible frame is constructed of a plurality of structural components adjustably connected together in a unique configuration that enables the entire frame to be transformed between a stored configuration when not in use, and a deployed configuration during use. The stored configuration is substantially more compact than the deployed configuration, which allows the frame to be easily transported between different locations.

Figure 1:
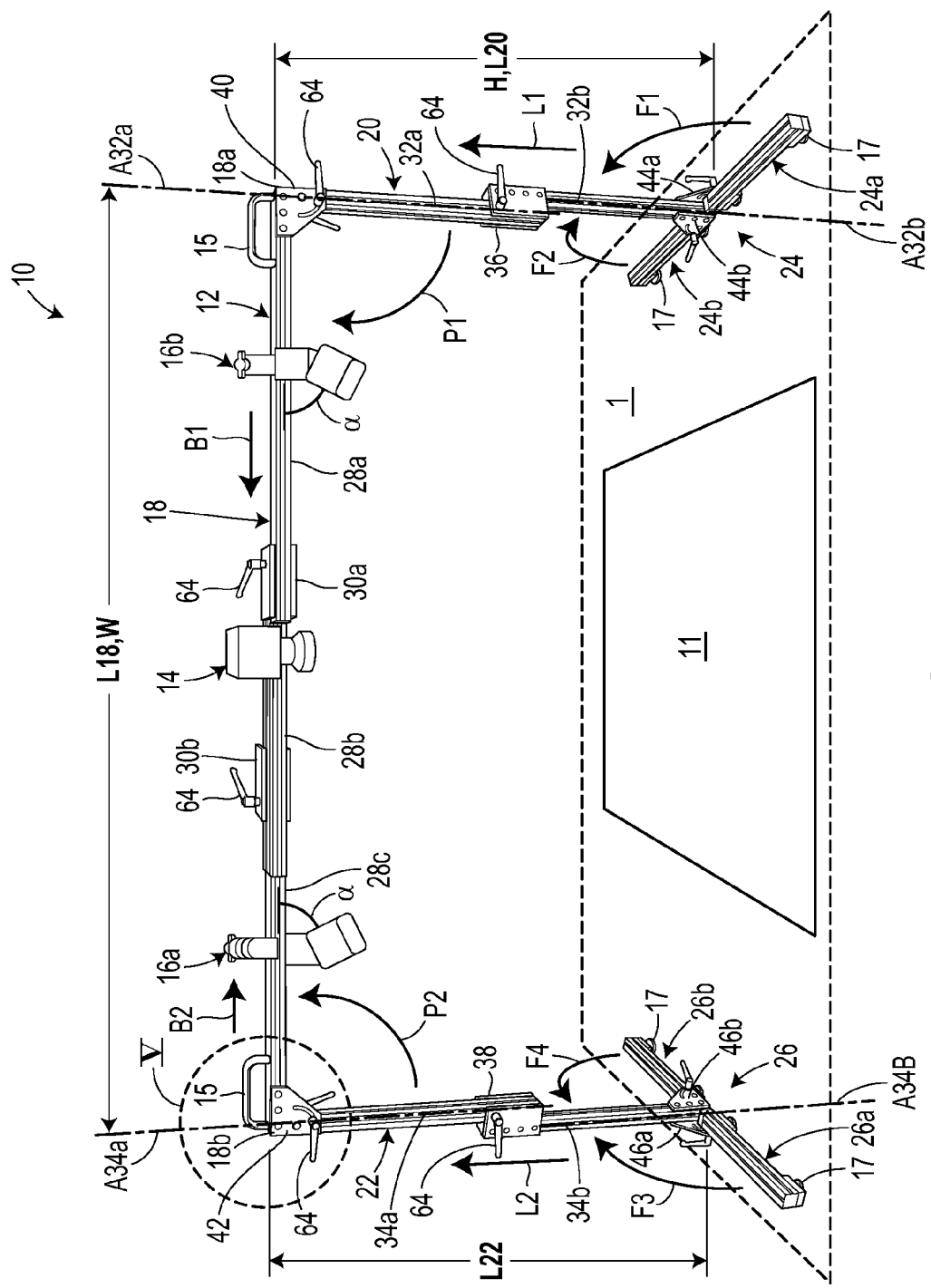
FIG. 1 depicts a first embodiment of a collapsible image capture system constructed in accordance with the teachings of the present disclosure.

With reference to the attached drawings, various examples (i.e., embodiments) of the system of the present disclosure will now be described. FIG. 1 depicts a first embodiment of a collapsible image capture system 10 constructed in accordance with the teachings of the present disclosure. The system 10 includes a frame 12 and an image capture device 14, as well as first and second illumination devices 16a, 16b. The frame 12 is illustrated as being supported on a substantially flat support surface 1 such as a table for example, above a target object 11, which is also supported on the support surface 1. Neither the support surface 1 nor the target object 11 constitute aspects of the invention, but rather, are included herein to facilitate a complete understanding of the structure and operation of the system 10. As shown in FIG. 1, the various components of the system, 10 are arranged such that the target object 11 is positioned directly beneath the image capture device 14 and at least partly within in a field of view of the image capture device 14, as well as within a field of illumination of the illumination devices 16a, 16b. As such, during use, the image capture device 14 and illumination device 16a, 16b, which can include conventional photography flashes, for example, can be synchronously activated to capture a high resolution image of the target object 11/Each of the various components of the system 10 will now be described.

The frame 12 includes a primary boom member 18, a first leg 20, a second leg 22, a first set of feet 24, and a second set of feet 26. The first leg 20 is coupled to a first end 18a of the primary boom member 18. The second leg 22 is coupled to a second end 18b of the primary boom member 18. Each foot 24a, 24b of the first set of feet 24 is coupled to the first leg 20 at a location opposite the primary boom member 18. Each foot 26a, 26b of the second set of feet 26 is coupled to the second leg 22 at a location opposite the primary boom member 18. So configured, the first and second legs 20, 22 are adapted to support the primary boom member 18 in the illustrated generally horizontal orientation above the support surface 1, and the first and second sets of feet 24, 26 are adapted to support the first and second legs 20, 22 in the illustrated generally vertical orientation. While the present embodiment of the first and second sets of feet 24, 26 are depicted as including two feet each, it should be appreciated that alternative embodiments can include generally any number of feet including a single foot for each set of feet, for example.

In the present embodiment, the image capture device 14 and each of the illumination devices 16a, 16b is removably coupled to the primary boom member 18, as will be described in more detail below. In FIG. 1, the image capture device 14 is coupled to a generally central location on the primary boom member 18, and between the first and second illumination devices 16a, 16b. So configured, as mentioned, the image capture device 14 is configured to capture an image of the target object 11, which is positioned on the support surface 1 at a location generally centrally between the first and second legs 20, 22 of the frame 12. So configured, upon activation of the image capture device 14, the illumination devices 16a, 16b can be activated, if desired, to help illuminate the target object 11 and enhance the clarity of the captured image, for example. While FIG. 1 depicts the image capture device 14 coupled to a generally central location on the primary boom member 18 and between the illumination devices 16a, 16b, other configurations are possible as each of the components of the system 10 are adjustably coupled together, thereby defining a versatile system 10 capable of meeting varying demands.

Figure 4:
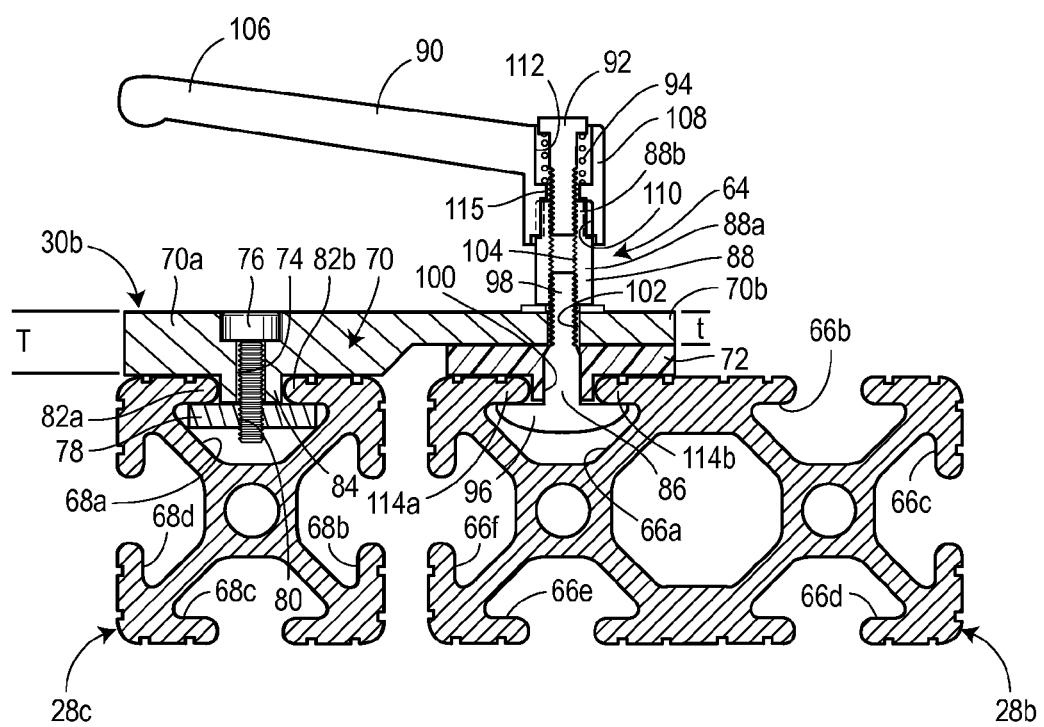
FIG. 4 is a cross-sectional view taken through line IV-IV of FIG. 3.

Still referring to FIG. 1, the primary boom member 18 includes a first boom component 28a, a second boom component 28b, and a third boom component 28c. In the instant embodiment, the first, second, and third boom components 28a, 28b, 28c can include extruded aluminum components, such as those that are commercially available from 80/20® Inc., which has products available for purchase at www.8020.net. In one embodiment, the first and third boom components 28a, 28c can include extruded aluminum components having what 80/20® Inc. refers to as a "1515 profile" and the second boom component 28b can include an extruded aluminum component having what 80/20® Inc. refers to as a "1530 profile," for example. As such, and as depicted in FIG. 4, the second boom component 28b includes a generally rectangular cross-section defining first through sixth elongate channels 66a-66f formed therein and the third boom component 28c includes a generally square cross-section with first through fourth elongate channels 68a-68d formed therein. Although not depicted in FIG. 4, the first boom component 28a is configured with a cross-section identical to that of the third boom component 28c and, as such, also includes first through fourth elongate channels 68a-68d. While the boom components 28a, 28b, 28c have been described as including extruded aluminum components, in other embodiments, each of the boom components 28a, 28b, 28c can include generally any elongated structure constructed of any material capable of serving the principles of the present disclosure.

Figure 3:
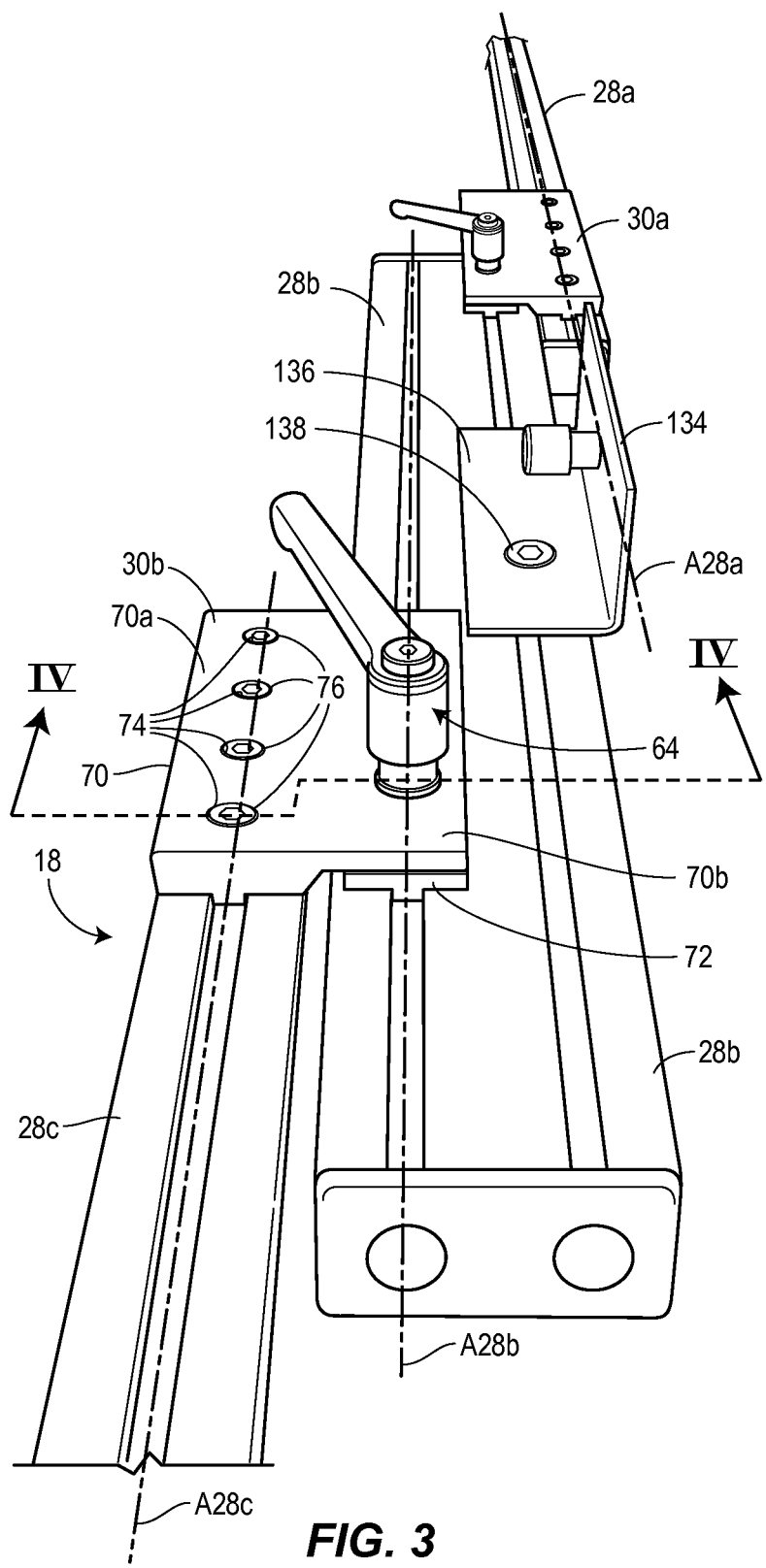
FIG. 3 is a perspective view of a primary boom member of the collapsible image capture system of FIGS. 1 and 2 viewed from above.

Referring back to FIG. 1, the second boom component 28b is disposed between the first and third boom components 28a, 28c. Each of the first and third boom components 28a, 28c is slidably coupled to the second boom component 28b. In the present embodiment, the first boom component 28a is slidably coupled to the second boom component 28b via a first boom slide connector 30a, and the third boom component 28c is slidably coupled to the second boom component 28b via a second boom slide connector 30b. As shown in FIG. 3, for example, the first, second, and third boom components 28a, 28b, 28c of the instant embodiment are arranged side-by-side, such that they include parallel central longitudinal axes A28a, A28b, A28c. This arrangement, in combination with the boom slide connectors 30a, 30b, facilitates sliding of the first and third boom components 28a, 28c relative to the second boom component 28b, thereby allowing for adjustment of an overall longitudinal dimension L18 of the primary boom member 18, which in turn allows for adjustment of a width W between the first and second legs 20, 22 of the frame 12.

Similar to the primary boom member 18, the first leg 20 of the frame 12 includes a first leg component 32a and a second leg component 32b, and the second leg 22 includes a first leg component 34a and a second leg component 34b. In the instant embodiment, the first and second leg components 32a, 32b, 34a, 34b of the first and second legs 20, 22, and each of the feet 24a, 24b, 26a, 26b are constructed of extruded aluminum, similar to that described above with respect to the various boom components 28a, 28b, 28c. For example, in the present embodiment, the various leg components 32a, 32b, 34a, 34b and each of the feet 24a, 24b, 26a, 26b can include extruded aluminum components commercially available from 80/20 Inc. and having what 80/20® Inc. refers to as a "1515 profile," for example. As such, each of the leg components 32a, 32b, 34a, 34b and each of the feet 24a, 24b, 26a, 26b includes a generally square cross-section with first through fourth elongated channels 68a-68d formed therein, identical to that described above with respect to the third boom component 28c depicted in FIG. 4. Additionally, as depicted in FIG. 1, each of the feet 24a, 24b, 26a, 26b includes a foot pad 17, which can be plastic, metal, or rubber for example.

In the present embodiment, the first leg component 32a of the first leg 20 is slidably coupled to the second leg component 32b of the first leg 20 via a first leg slide connector 36, and the first leg component 34a of the second leg 22 is slidably coupled to the second leg component 34b of the second leg 22 via a second leg slide connector 38. As is also shown in FIG. 1, for example, the first and second leg components 32a, 32b of the first leg 20 of the instant embodiment are arranged side-by-side such that they include parallel central longitudinal axes A32a, A32b. Similarly, the first and second leg components 34a, 34b of the second leg 22 of the instant embodiment are arranged side-by-side such that they include parallel central longitudinal axes A34a, A34b. This arrangement, in combination with the leg slide connectors 36, 38, facilitates sliding of the first and second leg components 32a, 32b, 34a, 34b relative to each other, thereby allowing for adjustment of an overall longitudinal dimension L20, L22 of the first and second legs 20, 22, which in turn, allows for adjustment of a height H (shown in FIG. 1) at which the primary boom member 18 resides above the support surface 1 and target object 11.

As mentioned above and depicted in FIG. 1, the first and second legs 20, 22 are coupled to the first and second ends 18a, 18b, respectively, of the primary boom member 18. Moreover, the first set of feet 24a, 24b are coupled to the first leg 20 opposite the primary boom member 18, and the second set of feet 26a, 26b are coupled to the second leg 22 opposite the primary boom member 18. More specifically, in the present embodiment, the first leg 20 is pivotally coupled to the first end 18a of the primary boom member 18 via a first leg pivot connector 40, and the second leg 22 is pivotally coupled to the second end 18b of the primary boom member 18 via a second leg pivot connector 42. Additionally, the first and second feet 24a, 24b of the first set of feet 24 are pivotally coupled to the first leg 20 via a first set of foot pivot connectors 44a, 44b, and the first and second feet 26a, 26b of the second set of feet 26 are pivotally coupled to the second leg 22 via a second set of foot pivot connectors 46a, 46b.

So configured, the first and second leg pivot connectors 40, 42 enable pivoting displacement of the first and second legs 20, 22 relative to the primary boom member 18. Additionally, the first set of foot pivot connectors 44a, 44b enable pivoting displacement of the first set of feet 24 relative to the first leg 20, and the second set of foot pivot connectors 46a, 46b enable pivoting displacement of the second set of feet 26 relative to the second leg 22.

With the various boom components 28a, 28b, 28c and leg components 32a, 32b, 34a, 34b coupled together via the various connectors 30a, 30b, 36, 38, 40, 42, 44a, 44b, 46a, 46b, as described, the frame 12 of the disclosed system 10 can be transformed between a deployed configuration (shown in FIG. 1) for use, and a stored configuration (shown in FIG. 2, for example) for storage and transportation. Prior to performing the transformation, however, the image capture device 14 and illumination devices 16a, 16b can, in some embodiments, be removed from the primary boom member 18.

Still referring to FIG. 1, to initiate collapsing of the frame 12, the feet 24a, 24b of the first set of feet 24 can be pivoted along arrows F1 and F2, respectively, from their deployed positions depicted in FIG. 1, wherein each foot 24a, 24b is disposed substantially perpendicular to the first leg 20, to their stored positions, wherein each foot 24a, 24b is disposed beside and substantially parallel to the first leg 20. Similarly, the feet 26a, 26b of the second set of feet 26 can be pivoted along arrows F3 and F4, respectively, from their deployed positions depicted in FIG. 1, wherein each foot 26a, 26b is disposed substantially perpendicular to the second leg 22, to their stored positions, wherein each foot 26a, 26b is disposed beside and substantially parallel to the second leg 22. To further collapse the frame 12, the second leg components 32b, 34b of the first and second legs 20, 22 can be slid in the direction of arrows L1 and L2, respectively, alongside and relative to the associated first leg components 32a, 34a to thereby reduce the overall longitudinal dimensions L20, L22 of the first and second legs 20, 22. Further still, the first and third boom components 28a, 28c of the primary boom member 18 can be slid in the direction of arrows B1 and B2, respectively, alongside and relative to the second boom component 28b, to thereby reduce the overall longitudinal dimension L18 of the primary boom member 18. Finally, to further collapse the frame 12 into the stored configuration depicted in FIG. 2, for example, each of the collapsed legs 20, 22 can be pivoted in the direction of arrows P1 and P2, respectively, from their deployed positions depicted in FIG. 1, wherein each leg 20, 22 is disposed substantially perpendicular to the primary boom member 18 to their stored positions, wherein each leg 20, 22, including the associated sets of feet 24, 26 are dispose substantially parallel to the primary boom member 18. Accordingly, in the stored configuration of the frame 12, each of the components 28a, 28b, 28c of the primary boom member 18 and each of the components 32a, 32b, 34a, 34b of the legs 20, 22 are disposed substantially parallel to each other, thereby resulting in a collapsed frame 12 that is compact and easily transportable. In one embodiment, that collapsed frame 12 is relatively lightweight such that it may readily be handled by a single individual person. For example, the collapsed frame 12 might way approximately 40 lbs. To facilitate this handling, and as shown in FIG. 1, the frame 12 can include handles 15 such as those depicted in FIG. 1 attached to the first and second ends 18a, 18b of the primary boom member 18.

Figure 2:
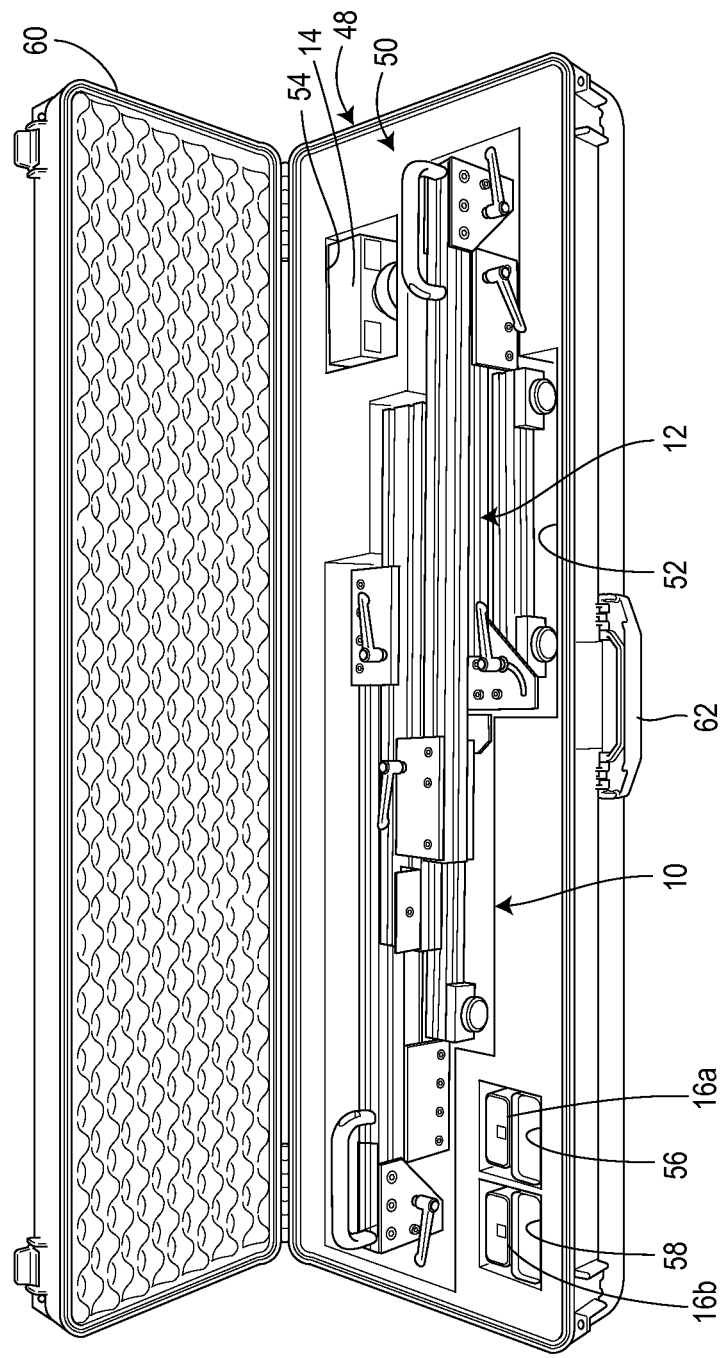
FIG. 2 depicts the collapsible image capture system of FIG. 1 is a stored configuration in a storage container.

In one embodiment, the collapsed frame 12 can be accommodated within a storage container 48, such as that depicted in FIG. 2. The embodiment of the container 48 depicted in FIG. 2 includes a hard shell case with a protective liner 50. As depicted, one embodiment of the liner 50 may define a first recess 52 for receiving the collapsed frame 12, a second recess 54 for receiving the image capture device 14 after it is removed from the frame 12, and third and fourth recesses 56, 58 for receiving the illumination devices 16a, 16b, respectively, after being removed from the frame 12. Finally, the container 48 can include a closeable lid 60 and a handle 62 for securing and transporting the entire system 10 in the container 48. While the container 48 depicted in FIG. 2 includes a hard shell case, in other embodiments the container 48 can include generally any type of container such as a bag, a box, etc. Moreover, while the container 48 is illustrated as accommodating the frame 12, the image capture device 14, and the illumination device 16*a*, 16*b*, alternative embodiments can include a separate container to accommodate the image capture device 14 and illumination devices 16*a*, 16*b*, or yet separate individual containers each accommodating one of the image capture device 14 and illumination devices 16*a*, 16*b*.

As mentioned above, the frame 12 includes a number of boom slide connectors 30*a*, 30*b*, leg slide connectors 36, 38, foot pivot connectors 44*a*, 44*b*, 46*a*, 46*b*, and leg pivot connectors 40, 42, which enable the frame 12 to be transformed between the deployed configuration depicted in FIG. 1 and the stored configuration depicted in FIG. 2. In addition to enabling the above-described transformation, the boom slide connectors 30*a*, 30*b* also allow for the width W of the frame to be adjusted such that the distance between the legs 20, 22 can be changed, if desired, to accommodate target objects 11 of different dimensions. Moreover, the leg slide connectors 36, 38 allow for adjustment of the height H of the primary boom member 18 relative to the target object 11. This height adjustment can be used, for example, to "zoom" the image capture device 14 in and out relative to the target object 11, to complement any zooming capabilities that may otherwise be built into the image capture device 14, for example. To satisfy the aforementioned transformation and adjustability of the frame 12, each of the various connectors 30*a*, 30*b*, 36, 38, 40, 42, 44*a*, 44*b*, 46*a*, 46*b* includes a locking device 64 which can be manipulated to lock and unlock adjacent boom or leg components 28*a*, 28*b*, 28*c*, 32*a*, 32*b*, 34*a*, 34*b*.

FIGS. 3 and 4 illustrate one embodiment of a fixing device 64 associated with the boom slide connectors 30*a*, 30*b*. FIG. 3 is a perspective view of the primary boom member 18 viewed from above and along the longitudinal axes A28*a*, A28*b*, A28*c* of the boom components 28*a*, 28*b*, 28*c*. FIG. 4 is a cross-sectional view taken through line IV-IV of FIG. 3, showing the components of the second boom slide connector 30*b* and its associated fixing device 64 coupled to the second and third boom components 28*b*, 28*c*.

Each boom slide connector 30*a*, 30*b* and associated fixing device 64 is generally identical in construction and, therefore, for the sake of brevity, a detailed description of only the second boom slide connector 30*b* and associated fixing device 64 will be provided. The second boom slide connector 30*b* generally includes a body plate 70 and a slide plate 72. In the present embodiment, the body plate 70 includes a generally rectangular aluminum plate, for example, including a bolted portion 70*a* and a locking portion 70*b*. As shown in FIG. 3, the bolted portion 70*a* of the present embodiment includes four apertures 74, each receiving a threaded fastener 76 for securing the body plate 70 to the third boom component 28*c*. As shown in FIG. 4, the apertures 74 can include countersunk bores such that a head of the fasteners 76 become flush with a top surface of the body plate 70 when installed. Moreover, as shown in FIG. 4, each of the fasteners 76 are threadably engaged into a corresponding threaded bore 80 of a locking plate 78 disposed within the first channel 68*a* of the third boom component 28*c*. So configured, tightening the threaded fasteners 76 into the corresponding threaded bores 80 urges the locking plate 78 toward the body plate 70 to sandwich a pair of flanges 82*a*, 82*b* defined by the boom component 28*c* adjacent the first channel 68*a*. This sandwiching creates a compressive force on the flanges 82*a*, 82*b* that generates friction that essentially locks the body plate 70 in position on the third boom component 28*c*, as illustrated. By loosening the threaded fasteners 74, however, it should be appreciated that the position of the body plate 70 along the longitudinal axis A28*c* of the third boom component 28*c* can easily be adjusted. That is, loosening the fasteners 74 releases the compressive force applied to the flanges 82*a*, 82*b* of the boom component 28*c*, which then allows the locking plate 78 to slide along the length of the first channel 68*a* into generally any desired position. Retightening of the fasteners 74 would then fix the body plate 70 into position. To help facilitate this sliding adjustment and maintain the alignment of the body plate 70 relative the boom component 28*c*, the bolted portion 70*a* of the body plate 70 of the present embodiment includes an elongate rib 84 that extends partially into the first channel 68*a*, as illustrated in FIG. 4, for example.

Still referring to FIG. 4, the locking portion 70*b* of the body plate 70 of the boom slide connector 30*b* has a thickness t that is smaller than a thickness T of the bolted portion 70*a* such that the slide plate 72 is able to reside between the locking portion 70*b* and the second boom slide connector 28*b*. In one embodiment, the slide plate 72 can be constructed of a material that easily slides relative to the second boom slide connector 28*b* such as a plastic material including, for example, a nylon material, a polyvinylchloride material, or any other material capable of serving the intended purpose. In other embodiments, the boom slide connector 28*b* may not include a slide plate 72 at all, but rather, the thicknesses t, T of the locking portion 70*b* and the bolted portion 70*a* can be the same, and the locking portion 70*b* can directly engage the second boom slide connector 28*b*. In one embodiment, the boom slide connector 30*b* including the body plate 70 and the slide plate 72 can include components which are commercially available from 80/20 Inc. under product number 6862 in the general category of Single Unibearing™ Bearings. Regardless of the specific configuration of the boom slide connector 30*b*, the fixing device 64 of the present embodiment serves to selectively lock the boom slide connector 30*b* into a desired position on the second boom component 28*b*, and is arranged and configured to facilitate adjustment of the longitudinal dimension L18 of the primary boom member 18.

As shown in FIG. 4, the fixing device 64 of the present embodiment includes a threaded bolt 86, a fastening collar 88, a handle 90, a lock screw 92, and a spring 94. The threaded bolt 86 includes a head 96 disposed within the first channel 66*a* of the second boom component 28*b* and a shank 98 extending upward through corresponding bores 100, 102 formed in the slide plate 72 and locking portion 70*b* of the body plate 70. The fastening collar 88 includes a hollow cylindrical member with internal threads 104 in threaded engagement with the shank 98 of the bolt 86. The embodiment of the collar 88 illustrated in FIG. 4 includes a base portion 88*a* having a generally circular cross-section and a nut portion 88*b* having a non-circular cross-section for facilitating engagement of the collar 88 by a portion of the handle 90. For example, in one embodiment, the nut portion 88*b* of the collar 88 can have a hexagonal cross-section, a square cross-section, or any other cross-section suitable for transferring a torsional load from the handle 90 to the collar 88, as will be described.

The handle 90, as shown, includes a generally L-shaped handle including a grasping portion 106 and a wrenching portion 108. The wrenching portion 108 includes a generally hollow cylindrical component including a wrenching bore 110 and a spring bore 112 separate by a radially inwardly projecting shoulder 14. The wrenching bore 110 includes an internal cross-section that corresponds to the external cross-section of the nut portion 88*b* of the collar 88. The spring bore 112 can include an internal surface that is generally cylindrical, for example, to accommodate the spring 94 and the lock screw 92, as shown in FIG. 4. That is, in the present embodiment, the spring 94 is disposed within the spring bore 112 of the wrenching portion 108 of the handle 90 and resides upon the shoulder 115 formed between the spring bore 112 and the wrenching bore 110. The lock screw 92 extends through the spring bore 112 and threadably engages the internal threads 104 of the collar 88. So configured, the lock screw 92 compresses the spring 94 between a head of the lock screw 92 and the shoulder 115 of the handle 90. In this configuration, the spring 94 biases the handle 90 onto the collar 88 and, more particularly, biases the wrenching bore 110 of the handle 90 into operable engagement with the nut portion 88b of the collar 88. So arranged, a user is free to grasp the grasping portion 106 of the handle 90 and rotate the wrenching portion 108 to tighten or loosen the collar 88 relative to the threaded shank 98 of the bolt 86.

Tightening the collar 88 onto the bolt 86 generates a compressive force that causes the head 96 of the bolt 86 and the slide plate 72 so sandwich opposing flanges 114a, 114b of the second boom component 28b, thereby securing the fixing device 64, the second boom slide connector 30b, and the third boom component 28c into position relative to the second boom component 28b. Once in this secured position, if it is desirable to change the position of the handle 90 relative to the collar 88 and bolt 86 without loosening the locking device 94, a user can simply displace the handle 90 away from the collar 88 against the bias of the spring 94. This displacement causes the wrenching bore 112 to disengage from the nut portion 88b of the collar 88, which then allows the user to reposition the handle 90 to a desired orientation. Once the desired orientation is reached, the user can release the handle 90 and the spring 94 will automatically urge the wrenching portion 108 back into engagement with the nut portion 88b of the collar 88. While the position of the handle 90 is adjustable as just described, it should be appreciated that the number of available positions of the handle 90 relative to the collar 88 can be limited depending on the particular cross-sectional shapes of the nut portion 88b of the collar 88 and the wrenching portion 108 of the handle 90. For example, in an embodiment where the nut portion 88b of the collar includes a square cross-section, the handle 90 may occupy any one of four distinct positions relative to the collar 88, while in embodiments where the nut portion 88b has a hexagonal cross-section, the handle 90 may occupy any one of six distinct positions relative to the collar 88, etc.

To adjust the position of the second and third boom components 28b, 28c relative to each other, a user can simply rotate the handle 90 in a direction to loosen the threaded connection between the collar 88 and the bolt 86. This releases the compressive force applied to the flanges 114a, 114b of the second boom component 28b. Once the compressive force is released, the head 96 of the bolt 86 can be slid in the first channel 66a of the second boom component 28b, which in turn allows the fixing device 64, the boom slide connector 30b, and the third boom component 28c to be displaced relative to the second boom component 28b. This displacement enables adjustment of the overall length dimension L18 of the primary boom member 18 described above with reference to FIG. 1. In one embodiment, the fixing device 64 depicted in FIG. 4 and described with reference to the present embodiment can include a fixing device that is commercially available from 80/20® Inc., for example, under part number 6800 or 6850 in the general category of Linear Bearing Brake Kits.

As mentioned above, the first boom slide connector 30a and associated fixing device 64 depicted in FIGS. 1 and 3 is substantially identical to the second boom slide connector 30b and associated fixing device 64 described immediately above, and therefore, will not be described separately. Moreover, as mentioned above, the first and second legs 20, 22 of the frame 12 also include leg slide connectors 36, 38, respectively, for adjusting the position of the first leg components 32a, 34a relative to the second leg components 32b, 34b. In the present embodiment, the leg slide connectors 36, 38 are substantially identical to the boom slide connector 30a described above and additionally, each leg slide connector 36, 38 includes a fixing device 64 that is substantially identical to the fixing device 64 described above as being associated with the boom slide connectors 30a, 30b. Accordingly, for the sake of brevity, neither the leg slide connectors 36, 38 nor their associated fixing devices 64 will be described in detail.

Based on the foregoing, it should be appreciated that the boom slide connectors 30a, 30b and associated fixing devices 64 enable for simple adjustment and selective fixation of the longitudinal position of the various boom components 28a, 28b, 28c relative to one another for adjusting the longitudinal dimension L18 of the primary boom member 18 and the width W of the frame 12 between the legs 20, 22. Moreover, the leg slide connectors 36, 38 and their associated fixing devices 64 enable for the simple adjustment and selective fixation of the longitudinal position of the first leg components 32a, 34a relative to the second leg components 32b, 34b for adjusting the longitudinal dimensions L20, L22 of the legs 20, 22 and the height H of the primary boom member 18. Such adjustability provides, as described above, a versatile system for capturing images of target objects of varying sizes. For example, in one embodiment, the width W of the frame 12 can be adjustable between approximately 1 meter and 2 meters. The height H can be adjustable between a height of approximately 0.5 meters and approximately 1.5 meters. So configured, the system 10 can, for example, be suitable for capturing images of target objects 11 having dimensions as small as a small book up to dimensions of approximately 1 meter by 2 meters. It should be appreciated that these dimensions for the frame 12 and the target objects are exemplary only. Other systems 10 can be designed and configured to generally any size to accommodate target objects of generally any size.

Figure 5:
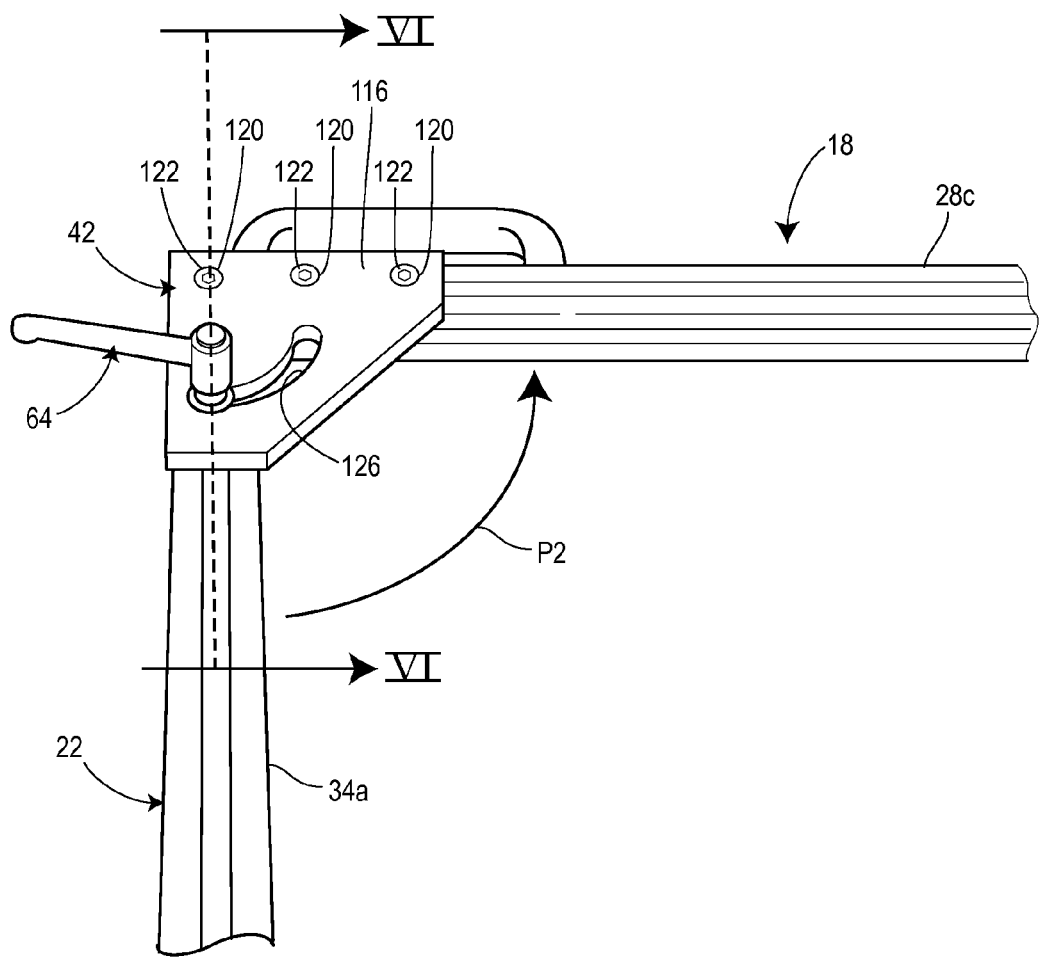
FIG. 5 illustrates a detailed view of a second leg pivot connector of the collapsible image capture system of FIGS. 1 and 2.

Referring back to FIG. 1 and as described above, each of the legs 20, 22 of the frame 12 is pivotable relative to the primary boom member 18 and each of the feet 24a, 24b, 26a, 26b are pivotable relative to the corresponding legs 20, 22 for transforming the frame between the deployed configuration (FIG. 1) and stored configuration (FIG. 2). As is also mentioned above, the frame 12 is equipped with the leg pivot connectors 40, 42 and foot pivot connectors 44a, 44b, 46a, 46b to facilitate this pivoting movement. FIG. 5 illustrates a detailed view of the second leg pivot connector 42, which is positioned at the joint between the second leg 22 and the second end 18b of the primary boom member 18 depicted in FIG. 1.

Figure 6:
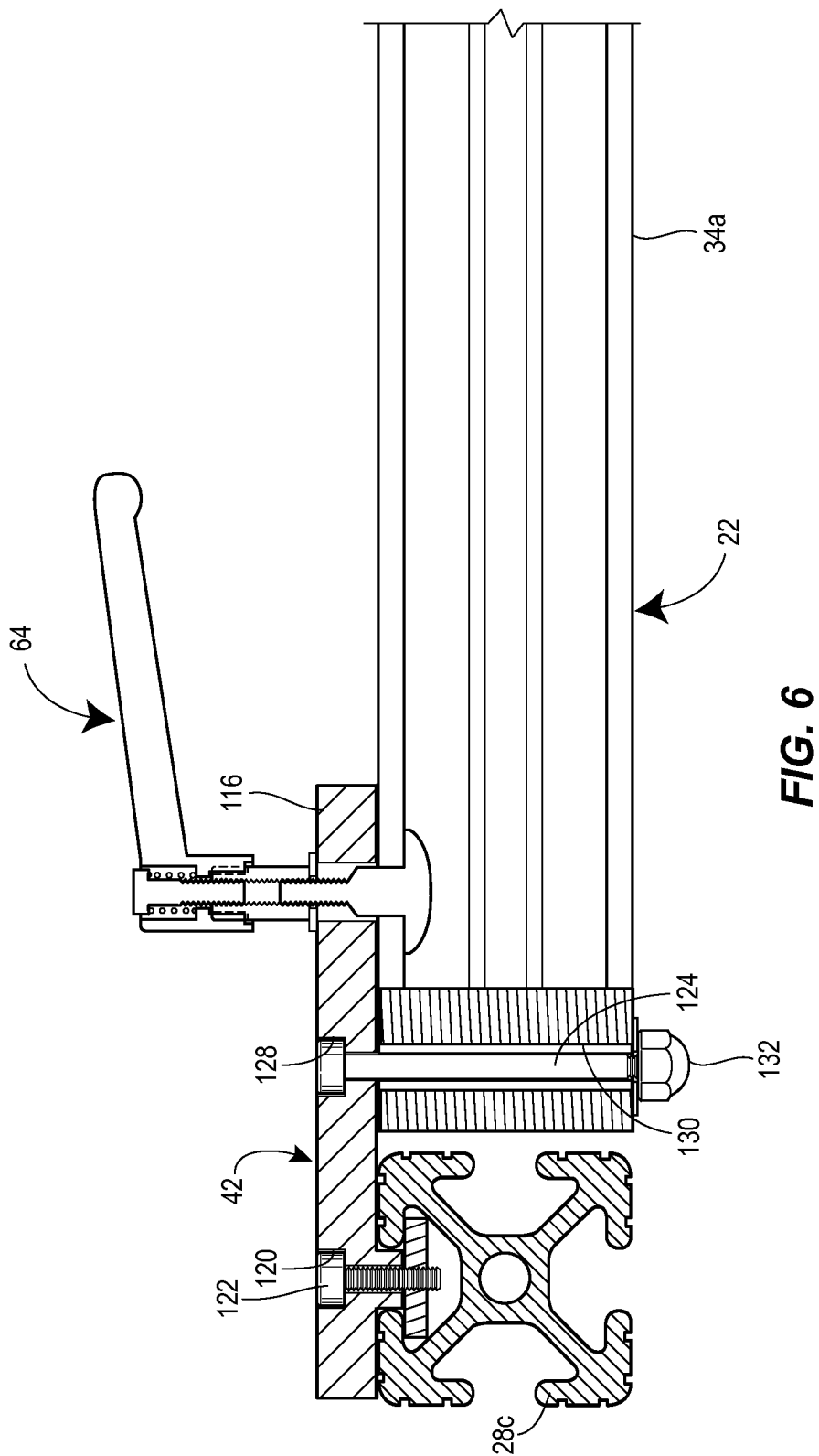
FIG. 6 is a cross-sectional view taken through line VI-VI of FIG. 5.

As illustrated in FIGS. 5 and 6, the leg pivot connector 42 includes a generally flat plate 116, a fixing device 64, and a pivot pin 124 (shown in FIG. 6). The plate 116 has a generally triangular shape and defines three apertures 120 and an arcuate slot 126. In one embodiment, the leg pivot connector 42 including the flat plate 116 can be a component that is commercially available from 80/20® Inc. under part numbers 4339/4348, which constitute right and left handed versions, in the general category of 90 Degree Pivot Bracket Assemblies. The three apertures 120 receive threaded fasteners 122 securing the plate 116 to the third boom component 28c of the primary boom member 18. As depicted in FIG. 6, the fasteners 122 secure the plate 116 to the third boom component 28c in a manner that is identical to the manner in which the fasteners 76 depicted in FIGS. 3 and 4 secure the body plate 70 of the second boom slide connector 30b to the third boom component 28c. The arcuate slot 126 extends in the plate 116 in a direction generally along the path of travel of the leg 22 indicated by arrow P2 in FIGS. 1 and 5, and receives the fixing device 64.

As shown in FIG. 6, the fixing device 64 associated with the leg pivot connector 42 of the present embodiment is identical to the fixing device 64 described above with reference to the boom slide connector 30b depicted in FIGS. 3 and 4. The pivot pin 124, as shown in FIG. 6, extends through a pivot aperture 128 formed in the flat plate 116 of the leg pivot connector 42 and a pivot bore 130 formed in a component attached to the end of the leg 22. In one embodiment, the pivot bore 130 can be defined by a component that is commercially available from 80/20® Inc. under part number 4387 in the general category of 90 Degree Pivot Bracket Assemblies. An end of the pivot pin 124 positioned opposite the flat plate 116 can include a cap nut 132 threaded thereon for securing the pivot pin 124 to the leg 22 and plate 116.

With the leg pivot connector 42 arranged and configured as described and depicted herein, a user can easily loosen the fixing device 64 in a manner identical to that described above to pivot the leg 22 relative to the primary boom member 18 and subsequently tighten the fixing device 64 to fix the leg 22 in the desired position. While the foregoing provides a description of the second leg pivot connector 42 of the frame 12, it should be appreciated that the first leg pivot connector 40, and each of the foot pivot connectors 44a, 44b, 46a, 46b are constructed in an identical manner. Therefore, a detailed description of these identical connectors will not be provided.

As discussed above, the present embodiment of the system 10 includes the image capture device 14 and illumination devices 16 removably coupled to the primary boom member 18. Referring back to FIG. 3, one embodiment of the system can include a bracket 134 coupled to the second boom component 28b for removably coupling the image capture device 14 thereto. For example, as shown in FIG. 3, one embodiment of the bracket 134 can include an L-shaped piece of aluminum or other suitable material. A first flange 136 of the bracket 134 can be arranged substantially flush to a surface of the second boom component 28b and removably secured to the second channel 66b of the second boom component 28b with a threaded fastener 138 in a manner similar to that which the body plate 70 of the boom slide connector 30b is connected to the first channel 68a of the third boom component 28c depicted in FIG. 4, for example. A second flange 140 of the bracket 134, which extends generally at a right angle from the first flange 136, can include a thumb screw 142, for example, for securing the actual image capture device 14 to the bracket 134. In some embodiments, the thumb screw 142 includes a size (e.g., ¼-20 screw) that is standard to accommodate corresponding threaded bores on standard digital camera hard case housings. While the bracket 134 has been disclosed as being coupled to the second boom component 28b, it should be appreciated that the bracket 134 can be coupled to any of the boom components 28a, 28b, 28c for any given application.

The image capture device 14 can include any standard digital camera such as, for example, a digital camera including a charge-coupled device (CCD) sensor or a complementary metal-oxide semiconductor (CMOS) sensor. In one embodiment, the image capture device 14 can include a single lens reflex camera (SLR) such as any one of those offered commercially by Canon including, for example, the Canon EOS-1Ds Mark III. Other similar cameras can also be used. In some embodiments, the image capture device 14 can include a polarizer filter, or some other filter to ensure high quality images and captured. In one embodiment, the system 10 can further include a remote trigger, for example, that wirelessly communicates with the image capture device 14. So configured, the image capture device 14 can be activated to capture images without requiring a user of the system 10 to physically contact the image capture device 14. This advantageously reduces the potential for bumping the system 10 or otherwise introducing movement that may reduce the quality of the captured image.

Referring back to FIG. 1, and as mentioned above, the system 10 of the presently disclosed embodiment further includes the first and second illumination devices 16a, 16b. In the disclosed embodiment, the illumination devices 16a, 16b constitute conventional professional clip-on flashes such as the Speedlite 580EX II model offered for sale by Canon, for example. As depicted in FIG. 1, each of the illumination devices 16a, 16b are coupled to the primary boom member 18 on opposite sides of the image capture device and are directed to project light onto the target object 11 during an image capture operation. The illumination devices 16a, 16b include their own spring clips or mounting clamps, for example, for being removably mounted to the primary boom member 18. In one embodiment, the illumination devices 16a, 16b are in communication with the image capture device 14 and/or a remote trigger to synchronize the flashes with the capturing of the image by the image capture device 14. In the depicted embodiment, the illumination devices 16a, 16b include flash bulbs 17a, 17b directed at an angle $\alpha$ relative to the primary boom member 18. The angle $\alpha$ can be in a range of approximately 90° to approximately 15°, and in one embodiment the angle $\alpha$ can be 45°. In some embodiments, the angles of the two illumination devices 16a, 16b can be the same or can be different depending on the specific application.

Figure 7:
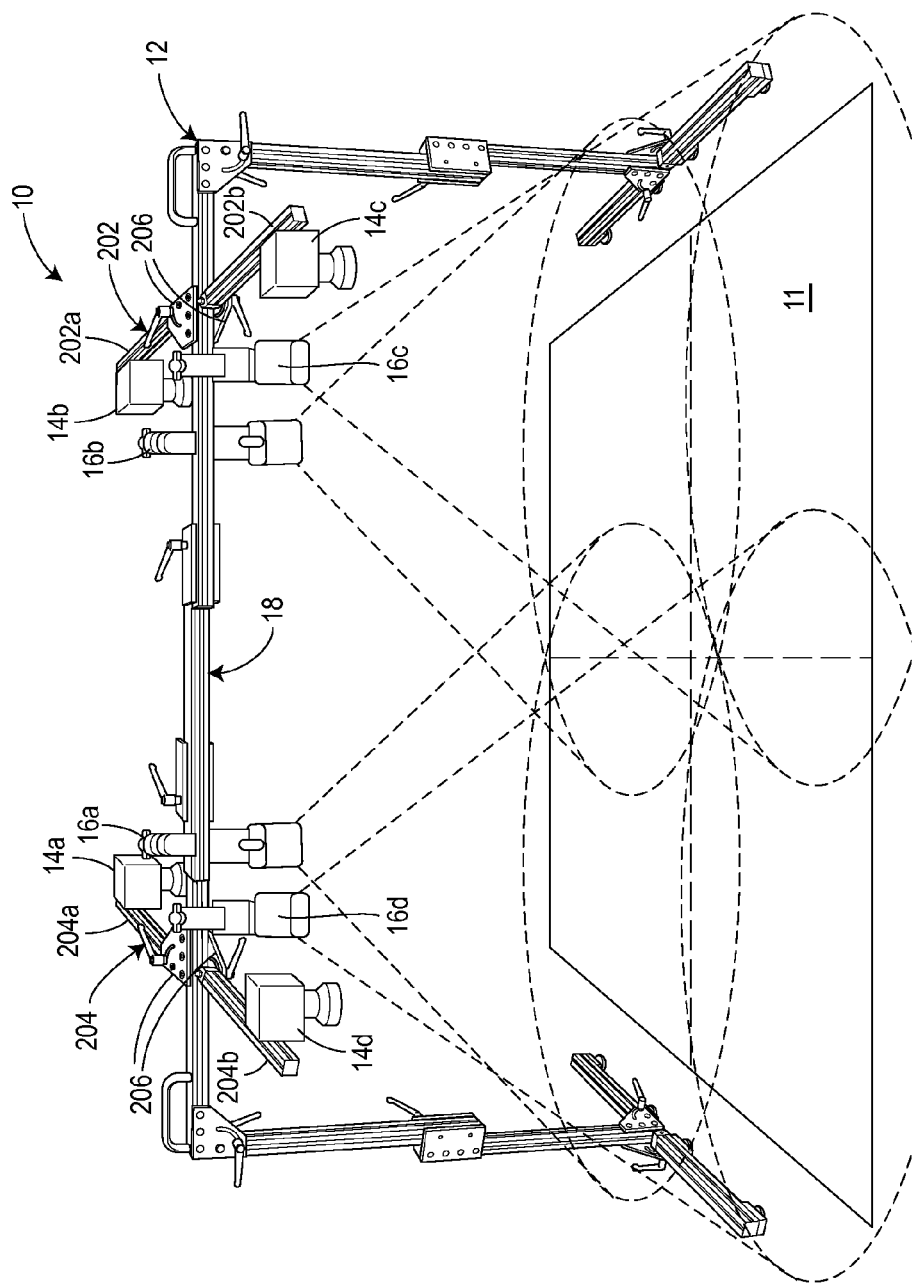
FIG. 7 depicts one alternative embodiment of a system constructed in accordance with the teachings of the present disclosure.

While the system 10 of the embodiment depicted in FIG. 1 includes a single image capture device 14 and first and second illumination devices 16a, 16b mounted directly to the primary boom member 18 of the frame 12, alternative embodiments of the system 10 can be arranged and configured to include more than one image capture device 14 and/or more than two illumination devices 16. The use of multiple image capture devices can facilitate the capture of high resolution images of target objects of relatively large dimensions. FIG. 7 depicts one such alternative embodiment of a system 10 constructed in accordance with the teachings of the present disclosure, wherein the frame 12 supports first through fourth image capture devices 14a, 14b, 14c, 14d above a target object 11. Moreover, the system 10 depicted in FIG. 7 also includes first through fourth illumination devices 16a, 16b, 16c, 16d corresponding, respectively, to the first through fourth image capture devices 14a, 14b, 14c, 14d. The frame 12 of the system 10 depicted in FIG. 7 is identical the frame 12 described above with reference to FIGS. 1-6, with the exception that in addition to the primary boom member 18, the frame 12 also includes a set of secondary boom members 202, 204, as illustrated. The secondary boom members 202, 204 can be constructed identical to any of the boom and leg components described above, e.g., of 80/20® extruded aluminum or generally any other suitable material. As illustrated, each secondary boom member 202, 204 of the present embodiment includes first and second boom components 202a, 202b, 204a, 204b pivotably coupled to the primary boom member 18 via boom pivot connectors 206. The boom pivot connectors 206 are identical to the leg and foot pivot connectors 40, 42, 44a, 44b, 46a, 46b described above with reference to FIGS. 5 and 6 and allow a user to easily pivot each of the boom components 202a, 202b, 204a, 204b relative to the primary boom member 18 between a deployed position (shown in FIG. 7), wherein each is disposed generally perpendicular to the primary boom member 18 and a stored position (not shown), wherein each is disposed generally parallel to the primary boom member 18. This pivoting facilitates storage of the frame 12 when the secondary boom members 202, 204 occupy the stored positions. In alternative embodiments, the secondary boom members 202, 204 can be removable from the primary boom member 18 to facilitate storage.

As depicted, each of the first through fourth image capture devices 14a, 14b, 14c, 14d of the system of FIG. 7 is removably mounted to one of the boom components 202a, 202b, 204a, 204b of the secondary boom members 202, 204 at a location spaced from the primary boom member 18. The image capture devices 14a, 14b, 14c, 14d can be removably mounted to the secondary boom components 202, 204 with a bracket 134 (not shown) identical to the bracket 134 that was described above with respect to FIG. 3, for example. So arranged, the image capture devices 14a, 14b, 14c, 14d of this alternative embodiment are arranged and configured to have fields of view adapted to individually capture an image of only a portion of the target object 11. In the depicted embodiment, the image capture devices 14a, 14b, 14c, 1d are arranged in a square pattern and, as such, each captures an image of a particular quadrant of the target object 11. In some embodiments, the four image capture devices 14a, 14b, 14c, 14d are controlled by a single remote trigger to ensure that the image capture functions of each of the image capture devices 14a, 14b, 14c, 14d are synchronized. Subsequent electronic processing can then be relied upon to stitch the four images together to generate a single image of high resolution. Prior to capturing images with the image capture devices 14a, 14b, 14c, 14d, a set up process may be implemented to for aligning and calibrating the image capture devices 14a, 14b, 14c, 14d. In one set-up process, the image capture devices 14a, 14b, 14c, 14d can be aligned and calibrated using a test pattern or grid, for example. The test pattern could have focus targets at the corners to ensure that the image capture devices are arranged perpendicular to the target object and properly focused. Additionally, such test patterns could have standard material formats (e.g., standard sizes) to allow for calibration of the height of the primary boom member 18 and camera zoom.

To complement the arrangement of the image capture devices 14a, 14b, 14c, 14d, the system 10 of FIG. 7 also includes first through fourth illumination devices 16a, 16b, 16c, 16d, each arranged to selectively illuminate a particular quadrant of the target object 11, as represented by the cones of projection shown with dashed lines. The illumination devices 16a, 16b, 16c, 16d can be identical to the illumination devices 16 described above with respect to the embodiment depicted in FIGS. 1-6, for example, and can also be controlled by the single remote trigger discussed above with respect to the image capture devices 14a, 14b, 14c, 14d. While the illumination devices 16a, 16b, 16c, 16d are illustrated as being removably mounted to the primary boom member 18, in an alternative embodiment, they could be removably mounted to the secondary boom members 202, 204, or generally any other location on the frame 12 to accomplish the intended objective of controlled and accurate lighting.

To this end, the illumination devices 16 disclosed herein with respect to any of the foregoing embodiments can be utilized in practice without any light filters, or alternatively, they may be equipped with one or more filters or polarizers for reducing glare and reflections, or for minimizing the risk of damaging older light sensitive target objects, for example. Moreover, the illumination devices 16 may be used in conjunction with any one or more types of diffusers for ensuring a uniform illumination of the target object 11.

While the alternative embodiment of the system 10 includes two secondary boom members 202, 204, first through fourth image capture devices 14a, 14b, 14c, 14d, and first through fourth illumination devices 16a, 16b, 16c, 16d, it should be appreciated that this is merely an example of an alternative and other alternative embodiments can be equipped with generally any number of these components arranged in generally any configuration to achieve an intended objective.

Thus far, the primary boom member 18 and legs 20, 22 of the frames 12 described herein have been described as being constructed of aluminum extrusion with various components slidably connected together with connectors (e.g, the boom slide connectors 30a, 30b and the leg slide connectors 36, 38). So configured, as described above, the various primary boom components 28a, 28b, 28c and the various leg components 32a, 32b, 34a, 34b of the legs 20, 22 are arranged generally parallel to each other for sliding displacement in order to adjust the height H and width W of the frame 12. It should be appreciated that the present disclosure is not limited to the specific type of construction thus far described.

Figure 8:
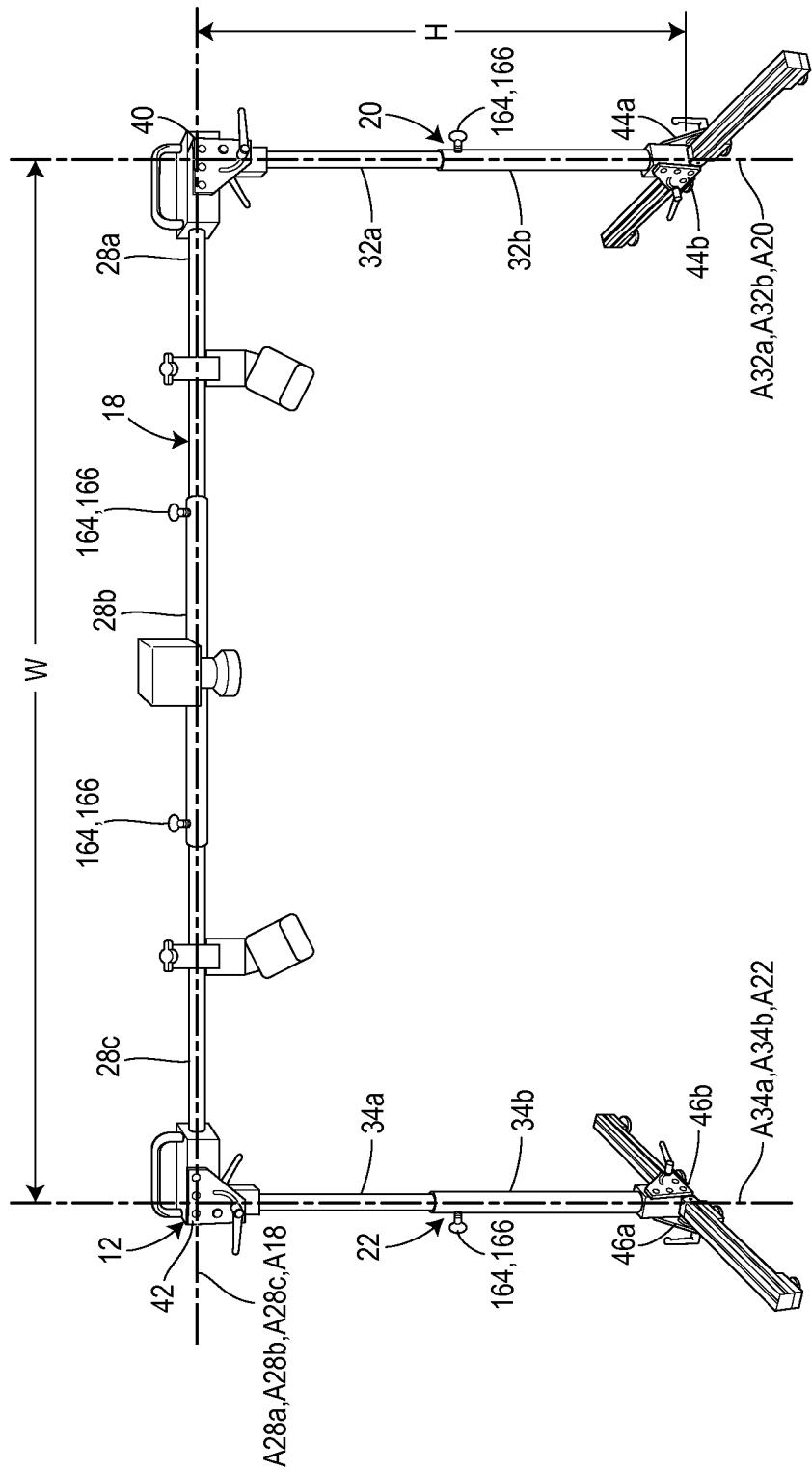
FIG. 8 depicts another alternative embodiment of a system constructed in accordance with the teachings of the present disclosure.

For example, one alternative construction, which is depicted in FIG. 8, could include a primary boom member 18 and legs 20, 22 that include telescoping components 28a, 28b, 28c, 32a, 32b, 34a, 34b, as is conventionally understood. In such a configuration, the first through third boom components 28a, 28b, 28c have coincident central longitudinal axes A28a, A28b, A28c. Similarly, the leg components 32a, 32b of the first leg 20 have coincident central longitudinal axes A32a, A32b, and the leg components 34a, 34b of the second leg 22 have coincident central longitudinal axes A34a, A34b. Said another way, in the embodiment of FIG. 8, the first through third boom components 28a, 28b, 28c can share a common central longitudinal axis A18. Similarly, the first and second leg components 32a, 32b of the first leg 20 can share a common central longitudinal axis A20, and the first and second leg components 34a, 34b of the second leg 22 can share a common central longitudinal axis A22. In the depicted embodiment, the various components 28a, 28b, 28c, 32a, 32b, 34a, 34b include hollow tubular members constructed of aluminum, for example, or some other sufficiently sturdy material. Each of the first leg components 32a, 34a includes a outer diameter that is smaller than an inner diameter of the corresponding second leg component 32b, 34b. As such, the first leg components 32a, 34a are slidably disposed inside of the corresponding second leg components 32b, 34b to facilitate adjustment of the height H of the frame 12. Similarly, in the disclosed embodiment, the first and third boom components 28a, 28c each includes an outer diameter that is smaller than an inner diameter of the second boom component 28b. So configured, the first and third boom components 28a, 28c are each slidably disposed in opposing ends of the second boom component 28b to facilitate adjustment of the width W of the frame 12.

To fix the height H and width W of the frame 12, the system 10 of FIG. 8 can include fixing devices 164 associated with each of the primary boom member 18 and legs 20, 22. The fixing devices 164 can be manually manipulable, for example, for selectively fixing the position of the various boom and leg components 28a, 28b, 28c, 32a, 32b, 34a, 34b relative to each other, as desired.

In FIG. 8, the fixing devices 164 include thumbscrew set screws 166. With reference to the first leg 20, the set screw 166 can be threaded through a threaded aperture formed in the second leg component 32b at a location proximate to where the second leg component 32b receives the first leg component 32b. To fix the position of the first and second leg components 32a, 32b together, a user can hand tighten the set screw 166 through the aperture in the second leg component 32b, which then forces the screw 166 into engagement with a portion of the first leg component 32a that resides within the second leg component 32b. To adjust the overall height of the leg 20, a user can easily loosen the set screw 166 and slide the first leg component 32a into or out of the second leg component 32b and retighten the set screw 166 at the desired location. The remaining fixing devices 164 associated with the second leg 22 and the primary boom member 18 operate in an identical manner.

But for the foregoing differences, the remainder of the system 10 depicted in FIG. 8 can be constructed in a manner identical to or similar to that which was described above with reference to FIGS. 1-6. For example, the frame 12 includes various leg and foot pivot connectors 40, 42, 44a, 44b, 46a, 46b for collapsing the frame 12 into a stored configuration similar to that which is depicted in FIG. 2. This stored configuration facilitates transportation and storage of the system 10 such that it may easily be used for imaging target objects 11 of varying dimensions at generally any user accessibly location.

In view of the foregoing, it should be appreciated that the present disclosure provides a versatile image capture system that can easily be transformed between a deployed configuration for use in capturing images of target objects of all different sizes, and a stored configuration that is compact relative the deployed configuration for storage and transportation. Moreover, when occupying the stored configuration the system can easily be accommodated within a case, bag, or other carrying case to be transported to a different location, set up, and used. Further still, the system of the present disclosure is advantageously operable through the use of a remote trigger system such that any number of image capture devices and illumination devices can be synchronously activated to ensure high image quality because such remote activation eliminates the necessity to physical contact the individual components, which can introduce movement that can distort the captured image. Further yet, the system advantageously does not actually have to contact the target object being captured. This is advantageous because many old documents, maps, posters, etc. are touch sensitive and must be carefully handled.

Finally, it should be appreciated that the present disclosure provides a number of examples of systems that the inventor understands to embody the invention of the present application. These examples, however, do not define the invention. Instead, the invention is defined to include that which is encompassed within the spirit and scope of the appending claims and all equivalents thereof.

What is claimed:

1. A collapsible image capture system, comprising:
   a primary boom member having a first end and a second end, the primary boom member comprising at least first and second boom components slidably disposed relative to each other for adjusting a longitudinal dimension of the primary boom member;
   a first leg coupled to the first end of the primary boom member and pivotable between a storage position that is substantially parallel to the primary boom member and a deployed position that is substantially perpendicular to the primary boom member, the first leg comprising first and second leg components slidably disposed relative to each other for adjusting a longitudinal dimension of the first leg;
   a second leg coupled to the second end of the primary boom member and pivotable between a storage position that is substantially parallel to the primary boom member and a deployed position that is substantially perpendicular to the primary boom member, the second leg comprising first and second leg components slidably disposed relative to each other for adjusting a longitudinal dimension of the second leg;
   at least one image capture device removably supported by the primary boom member at a location between the first and second legs when the first and second legs occupy the deployed positions, the image capture device having a field of view adapted to capture at least a portion of a target object disposed between the first and second legs;
   at least one first foot coupled to the first leg opposite the primary boom member and pivotable between a storage position parallel to the first leg and a deployed position perpendicular to the first leg; and
   at least one second foot coupled to the second leg opposite the primary boom member and pivotable between a storage position parallel to the second leg and a deployed position perpendicular to the second leg,
   the at least one first foot and at least one second foot adapted to support the first and second legs and the primary boom member on a support surface.

2. The system of claim 1, wherein the first and second boom components have parallel or coincident central longitudinal axes.

3. The system of claim 1, wherein the first and second leg components of the first leg have parallel or coincident central longitudinal axes, and the first and second leg components of the second leg have parallel or coincident central longitudinal axes.

4. The system of claim 1, further comprising a first leg pivot connector coupling the first leg to the first end of the primary boom member and a second leg pivot connector coupling the second leg to the second end of the primary boom member.

5. The system of claim 4, further comprising a fixing device associated with each of the first and second leg pivot connectors for selectively fixing the first and second legs, respectively, in the storage position and the deployed position.

6. The system of claim 1, further comprising:
   a boom slide connector slidably connecting the first and second boom components relative to each other;
   a first leg slide connector slidably connecting the first and second leg components of the first leg to each other; and
   a second leg slide connector slidably connecting the first and second leg components of the second leg to each other.

7. The system of claim 6, further comprising:
   a fixing device associated with each of the boom slide connector, the first leg slide connector, and the second leg slide connector for selectively fixing the position of the first and second boom components relative to each other, the first and second leg components of the first leg relative to each other, and the first and second leg components of the second leg relative to each other, respectively.

8. The system of claim 1, wherein the image capture device comprises a digital sensor including one of a charge-coupled device (CCD) sensor or a complementary metal-oxide semiconductor (CMOS) sensor.

9. The system of claim 1, wherein the image capture devices includes a polarizer.

10. The system of claim 1, wherein the image capture device comprises a single lens reflex (SLR) camera.

11. The system of claim 1, further comprising at least one illumination device removably supported by the primary boom component for illuminating the target supported between the first and second legs.

12. The system of claim 11, wherein the at least one illumination source comprises at least one of a diffuser, a polarizer, and a filter.

13. The system of claim 1, further comprising first and second secondary booms mounted perpendicular to the primary boom and arranged parallel to each other, and wherein the at least one image capture device comprises first and second image capture devices removably mounted to opposing ends of the first secondary boom and third and fourth image capture devices removably mounted to opposing ends of the second secondary boom, the first, second, third, and fourth image capture devices collectively defining the field of view for capturing first, second, third, and fourth images of first, second, third, and fourth regions, respectively, of the target object.

14. The system of claim 13, further comprising a wireless trigger in communication with each of the first, second, third, and fourth image capture devices for synchronizing the capture of the first, second, third, and fourth images.

15. A collapsible image capture system, comprising:
a primary boom member having a first end and a second end, the primary boom member comprising at least first and second boom components slidably disposed relative to each other for adjusting a longitudinal dimension of the primary boom member;
a boom fixing device carried by the first boom component and selectively operable to fix the first and second boom components relative to each other;
a first leg coupled to the first end of the primary boom member and pivotable between a storage position that is substantially parallel to the primary boom member and a deployed position that is substantially perpendicular to the primary boom member, the first leg comprising first and second leg components slidably disposed relative to each other for adjusting a longitudinal dimension of the first leg;
a first leg pivot connector and associated fixing device carried by the primary boom member and selectively operable to fix the first leg in the storage position and the deployed position;
a first fixing device carried by the first leg component of the first leg and selectively operable to fix the first and second leg components of the first leg relative to each other;
a second leg coupled to the second end of the primary boom member and pivotable between a storage position that is substantially parallel to the primary boom member and a deployed position that is substantially perpendicular to the primary boom member, the second leg comprising first and second leg components slidable relative to each other for adjusting a longitudinal dimension of the second leg;
a second leg pivot connector and associated fixing device carried by the primary boom member and selectively operable to fix the second leg in the storage position and the deployed position;
a second fixing device carried by the first leg component of the second leg and selectively operable to fix the first and second leg components of the second leg relative to each other;
at least one image capture device removably supported by the primary boom member at a location between the first and second legs when the first and second legs occupy the supporting positions, the at least one image capture device having a field of view adapted to capture at least a portion of a target object disposed between the first and second legs;
at least one illumination device removably supported by to the primary boom component for illuminating the target supported between the first and second legs;
at least one first foot coupled to the first leg opposite the primary boom member and pivotable between a storage position parallel to the first leg and a deployed position perpendicular to the first leg; and
at least one second foot coupled to the second leg opposite the primary boom member and pivotable between a storage position parallel to the second leg and a deployed position perpendicular to the second leg,
the at least one first foot and at least one second foot adapted to support the first and second legs and the primary boom member on a support surface.

16. The system of claim 15, further comprising:
a boom slide connector associated with the primary boom member for facilitating sliding adjustment of the first and second boom components relative to each other;
a first leg slide connector associated with the first leg for facilitating sliding adjustment of the first and second leg components of the first leg relative to each other; and
a second leg slide connector associated with the second leg for facilitating sliding adjustment of the first and second leg components of the second leg relative to each other.

17. The system of claim 15, wherein the first and second boom components have parallel or coincident central longitudinal axes.

18. The system of claim 15, wherein the first and second leg components of the first leg have parallel or coincident central longitudinal axes, and the first and second leg components of the second leg have parallel or coincident central longitudinal axes.

19. A portable image capture kit, comprising:
a frame transformable between a stored configuration for facilitating transportation of the frame and a deployed configuration during use, the frame including a primary boom member, a first leg, and a second leg, the first and second legs pivotably coupled to opposing ends of the primary boom member,
the primary boom member comprising at least first and second boom components slidably disposed relative to each other for adjusting a longitudinal dimension of the primary boom member,
the first leg pivotable between a storage position that is substantially parallel to the primary boom member and a deployed position that is substantially perpendicular to the primary boom member, the first leg comprising first and second leg components slidably disposed relative to each other for adjusting a longitudinal dimension of the first leg, and
the second leg pivotable between a storage position that is substantially parallel to the primary boom member and a deployed position that is substantially perpendicular to the primary boom member, the second leg comprising first and second leg components slidably disposed relative to each other for adjusting a longitudinal dimension of the second leg;
at least one image capture device adapted to be removably supported by the primary boom member at a location between the first and second legs when the frame occupies the deployed configuration, the at least one image capture device having a field of view adapted to capture at least a portion of a target object disposed between the first and second legs when the image capture device is supported by the primary boom member;

at least one illumination device adapted to be removably supported by the primary boom member for selectively illuminating the target object when the frame occupies the deployed configuration; and at least one carrying case adapted to accommodate at least one of the collapsible frame, the at least one image capture device, and the at least one illumination device.

20. A collapsible image capture system, comprising:

a primary boom member having a first end and a second end, the primary boom member comprising at least first and second boom components slidably disposed relative to each other for adjusting a longitudinal dimension of the primary boom member;

a first leg coupled to the first end of the primary boom member and pivotable between a storage position that is substantially parallel to the primary boom member and a deployed position that is substantially perpendicular to the primary boom member, the first leg comprising first and second leg components slidably disposed relative to each other for adjusting a longitudinal dimension of the first leg;

a second leg coupled to the second end of the primary boom member and pivotable between a storage position that is substantially parallel to the primary boom member and a deployed position that is substantially perpendicular to the primary boom member, the second leg comprising first and second leg components slidably disposed relative to each other for adjusting a longitudinal dimension of the second leg;

at least one image capture device removably supported by the primary boom member at a location between the first and second legs when the first and second legs occupy the deployed positions, the image capture device having a field of view adapted to capture at least a portion of a target object disposed between the first and second legs; and first and second secondary booms mounted substantially perpendicular to the primary boom and arranged substantially parallel to each other, and wherein the at least one image capture device comprises first and second image capture devices removably mounted to opposing ends of the first secondary boom and third and fourth image capture devices removably mounted to opposing ends of the second secondary boom, the first, second, third, and fourth image capture devices collectively defining the field of view for capturing first, second, third, and fourth images of first, second, third, and fourth regions, respectively, of the target object.

21. The system of claim 20, further comprising a wireless trigger in communication with each of the first, second, third, and fourth image capture devices for synchronizing the capture of the first, second, third, and fourth images.

* * * * *